(12) United States Patent
Stegman (10) Patent No.: US 11,841,866 B2
(45) Date of Patent: Dec. 12, 2023

(54) ADAPTIVE SEARCH RESULT RE-RANKING

(71) Applicant: Yext, Inc., New York, NY (US)

(72) Inventor: Pierce Stegman, Arlington, VA (US)

(73) Assignee: Yext, Inc., New York, NY (US)

( * ) Notice: Subject to any disclaimer, the term of this patent is extended or adjusted under 35 U.S.C. 154(b) by 0 days.

(21) Appl. No.: 17/495,465

(22) Filed: Oct. 6, 2021

(65) Prior Publication Data

US 2023/0106319 A1   Apr. 6, 2023

(51) Int. Cl.
*G06F 16/2457* (2019.01)
(52) U.S. Cl.
CPC .............................. *G06F 16/24578* (2019.01)
(58) Field of Classification Search
CPC .................................................. G06F 16/24578
See application file for complete search history.

(56) References Cited

U.S. PATENT DOCUMENTS

| | | | |
|---|---|---|---|
| 2019/0294691 A1* | 9/2019 | Bortnikov | G06F 16/951 |
| 2019/0362025 A1* | 11/2019 | Zhou | G06N 20/00 |
| 2021/0097077 A1* | 4/2021 | Rogers | G06F 16/906 |

OTHER PUBLICATIONS

Hamida, Soufiane, et al. "Optimization of machine learning algorithms hyper-parameters for improving the prediction of patients infected with COVID-19." 2020 IEEE 2nd international conference on electronics, control, optimization and computer science (icecocs). IEEE, 2020. (Year: 2020).*
PCT Notification of Transmittal of the International Search Report and the Written Opinion of the International Searching Authority for PCT Application No. PCT/US2022/043804, dated Feb. 7, 2023, 8 pages.

* cited by examiner

*Primary Examiner* — Jay A Morrison
(74) *Attorney, Agent, or Firm* — Lowenstein Sandler LLP (57) ABSTRACT

A system and method to provide adaptively re-ranked search results in response to a search query. An initial ranking of search results associated with a search query is established. A query identifier associated with the search query received from an end-user system is identified. Based on the query identifier, a set of model parameters associated with the search query are identified. In response to receiving the search query, using a machine-learning model, a re-ranking of the search results based at least in part on the set of model parameters and the initial ranking of the search results is determined. The re-ranked search results are provided to the end-user system.

18 Claims, 6 Drawing Sheets

```
{"recommended_order": [1234, 6543, 7368, ...], // Limited to top 10 or 20
"entity_pairs": ( (1234, 6543): (2, 6), // this means entity 1234's
attractiveness score is 2 higher than 6543's score, with a sample size of 6
(6367, 7258): (-4, 10), ... ) )
```
210
212
214
216, 218

FIG. 2B
250

```
{
  "recommended_order": [3,2,5,1,4],
  "entity_pairs": {
    (1, 2): (34, 56),
    (4, 3): (-24, 73),
  },
  "time_decay": 0.9,
  "cluster_id": 35828,
}
```

ADAPTIVE SEARCH RESULT RE-RANKING

TECHNICAL FIELD

The present disclosure relates generally to a knowledge search platform. In particular, the present disclosure relates to adaptively re-ranking search results such that specific metrics are optimized (e.g., revenue, clicks, conversions).

BACKGROUND

Many companies (e.g., merchants) employ electronic systems to provide information to consumers. For example, a web-based search system may generate and return search results related to a search query received from an end-user system (e.g., smartphone, laptop, tablet). In this regard, the end users may use a search engine to obtain merchant-related information that is published and accessible via a network (e.g., the Internet). Search engines are software programs that search databases to collect and display information related to search terms specified by an end user.

The presentation of the search results has a significant impact on the way that an end user interacts with those search results. For example, a result that is ranked lower in the list order may receive fewer interactions or clicks than another result that is listed higher in the list order, simply because the average user may not read all the presented results. The lower-listed result may be a better or more optimal result, yet it receives fewer clicks due to its placement in the list. This concept of "rank bias" can cause result interaction data (e.g., clicks, purchases, appointment bookings) to be an unreliable measurement of search result quality.

Some typical search engines attempt to address the problems associated with rank bias by employing a swapping technique where neighboring search results are swapped on every search. The swapping of the neighboring results is intended to counter the rank bias and more accurately estimate the relevance of each result given the number of clicks it receives. In this regard, the relevance of each search result can be used to re-rank the results such that more popular results are moved up in the search result rankings and corresponding order of presentation.

However, the above-identified approach has several significant drawbacks. For example, the neighbor-swapping technique fails to respond to changes in user trends (i.e., what is popular today may not be popular tomorrow). In addition, this technique requires swapping results on every search, which may result in a jarring visual experience for the end user. Furthermore, a query must be repeated multiple times by different users in order to correct for the rank bias (i.e., many users must perform the exact same search for the necessary data to be gathered to re-rank search results.

Moreover, the neighbor-swapping algorithms as proposed by typical search engines only optimizes for clicks and does not consider other factors, such as revenue, conversions, etc. Also, new entities (i.e., searchable data objects) cannot be added to the search index. For example, in the case of product searches, the typical algorithm cannot handle a new product being added to the database and requires that all searchable entities be known in advance.

BRIEF DESCRIPTION OF THE FIGURES

The present disclosure will be understood more fully from the detailed description given below and from the accompanying drawings of various implementations of the disclosure.

DETAILED DESCRIPTION

Aspects of the present disclosure address and overcome the aforementioned problems associated with the typical search result ranking systems by implementing methods and systems to adaptively re-rank search results over a period of time (herein referred to as an "adaptive search result re-ranking system" and "adaptive re-ranking method"). According to embodiments, the adaptive search result re-ranking system generates re-ranked search results that account for a time decay associated with one or more data points. In an embodiment, a data point (e.g., a click, purchase, conversion, interaction, etc.) that is used to rank search results can be assigned a slowly decreasing influence factor (also referred to as a "weighted factor") as the respective data point is replaced with more recent data points. For example, an attractiveness score can be calculated as a sum of a clicks over a period of time (e.g., over a previous month). An example attractiveness score value of "100" may be determined if there were 100 clicks. However, with time decay, each click can be assigned a weighting (e.g., a weighting value between 0 and 1) proportional to how old the click is. For example, clicks from last week may be counted as "1" and clicks from a week ago may be counted as "0.9", clicks from two weeks ago as "0.8", etc. Thus, in this example, the weighted attractiveness score may be 82 instead of the previous 100.

In this regard, certain previous algorithms only looked at total clicks, while the adaptive search result re-ranking system examines a weighted combination of ranking data points (e.g., clicks, purchases, conversions, interactions, etc.), where more recent ranking data points are assigned a weighting factor higher than older ranking data points. In an embodiment, the weighting factors are the individual weights assigned to each interaction (e.g., click, purchase, etc.). The weighted factors can be summed to get a single attractiveness value, where the final end-result is referred to as the "weighted factor" or "weighted sum".

As noted above, certain typical approaches employ a neighbor-swapping technique which switches search result positions on every search, producing a very jarring end-user experience if the end user refreshes the webpage. According to embodiments, the adaptive search result re-ranking system improves the end-user experience by employing a multi-phase process. In the first phase, each end user is placed in a test group (e.g., an AB test group), and the system stores the user's assigned test group for later reference. In an embodiment, using the stored test group designation, each end user is provided with the same search result ranking (e.g., order of search results) on subsequent searches. As end users continue to interact with the adaptive search result re-ranking system, the adaptive search result re-ranking system collects search result interaction data (e.g., clicks, purchases, etc.). This data is used to generate a machine-learning model that can predict the probability that a result will be seen given its position in the ranking. In an embodiment, the methods and systems predict a general probability that a result will be seen given its position. For example, a machine learning model can be implemented to generate a response of "0.6", indicating that the model predicts that 60% of users read the third result.

In an embodiment, the adaptive search result re-ranking system provides an improved approach to correcting for rank bias by using the machine-learning model in place of result swapping. In an embodiment, the machine learning model is an improvement upon the neighbor-swapping approach in that it does not require swapping results at all. Instead, the model predicts the proportion of users that will see each result and then uses this proportion to artificially increase interaction data (e.g., clicks, purchases, appointment bookings) for each result, inversely proportional to the result's probability of being seen. This corrects for the rank bias and allows interaction data to be compared between results in an unbiased manner.

According to embodiments, the adaptive search result re-ranking system can adaptively re-rank search results such that the search results are not tied to or associated with a specific search query. Typical systems re-rank search results based on a specific query. For example, typical systems may collect data for a query such as "Where can I buy a new iPhone?". In this example, if another end user initiates a second search with a slightly different query (e.g., "Where can I buy the new iPhone?"), the second end user will not see any of the re-rankings learned from the first query. Advantageously, the adaptive search result re-ranking system employs a query-clustering approach which clusters or groups similar queries together. Learned search result ranking and popularity metrics are then stored for a specific cluster of related queries and used to re-rank search results for each individual query associated with the cluster. This allows a query such as "Where should I buy a new iPhone?" to benefit from the re-ranking analysis of other similar searches (e.g., "Where can I buy a new iPhone?"), even if the specific search query has not yet been previously searched, as described below with reference to FIG. 5. In an embodiment, the relative attractiveness for each result is stored (e.g., "Result with ID 1234 has an attractiveness +5 greater than result with ID 4567"), and these relative attractiveness scores can be used as the comparator for a sorting algorithm. While each search in a cluster displays its own unique results, each set of results is sorted using the same set of shared comparators within the cluster.

According to embodiments, the adaptive search result re-ranking system collects data points relating to multiple different events (herein referred to as "search events") including binary and continuous events. For example, the adaptive search result re-ranking system can re-rank search results based on an optimization of a particular constraint (e.g., revenue) using one or more different types of search events.

According to embodiments, the adaptive search result re-ranking system can generate re-rankings for search results added after the re-ranking process has begun. In an embodiment, the adaptive search result re-ranking system can swap results in pairs if a lower ranked result in a pair was previously identified as a better result, as determined by data corresponding to an associated cluster. The swapping process continues until no more swaps can be performed (e.g., there are no more swaps that meet the swapping criteria). Further A/B testing is then used to establish how the new result compares to existing results. Once complete, the adaptive search result re-ranking system continues the standard re-ranking process (e.g., a tournament-based algorithm), moving results up or down as needed. If a search result is removed, the stored relative attractiveness scores for this result can be ignored upon subsequent re-rankings, as they are no longer required to re-rank search results.

Figure 1:
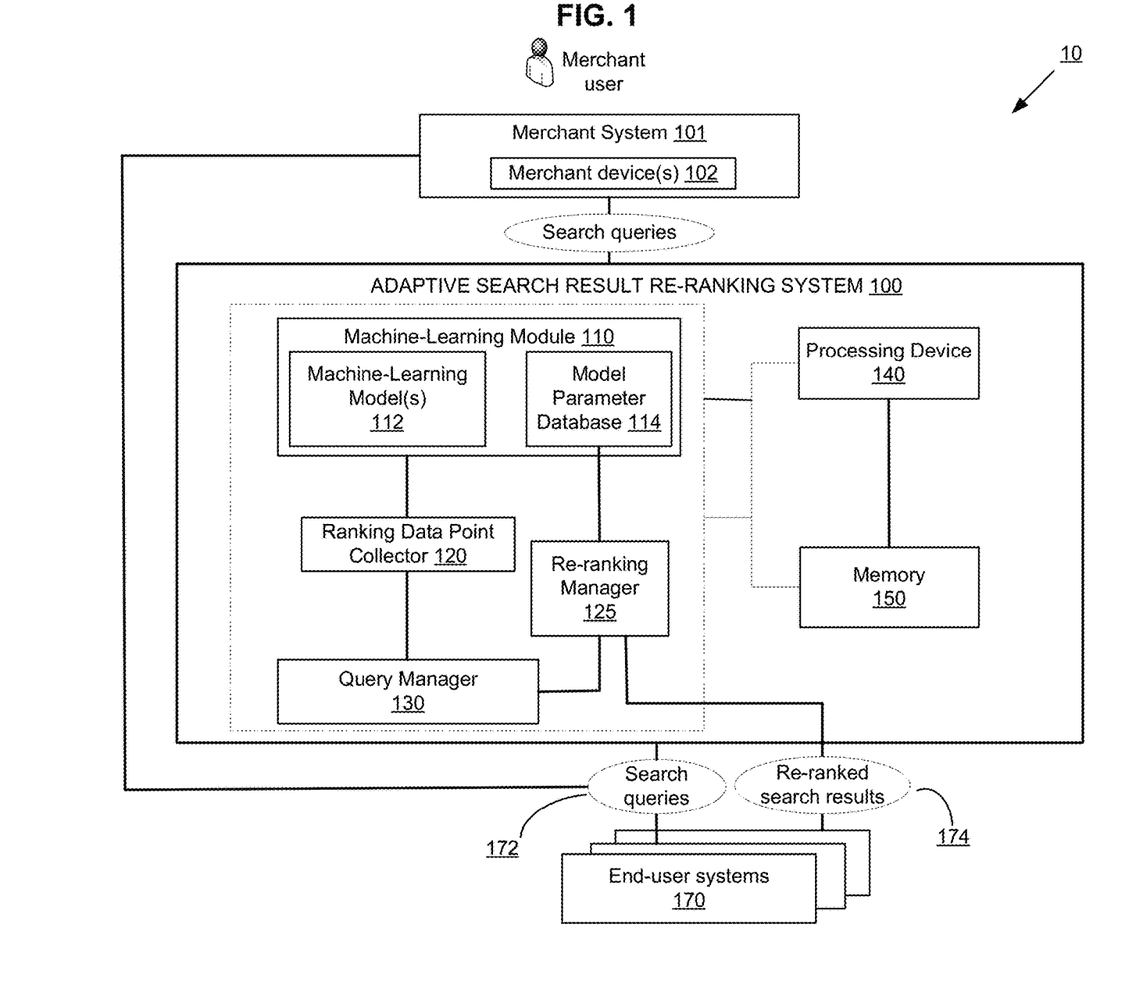
FIG. 1 illustrates an example environment that includes an adaptive search result re-ranking system, according to embodiments of the present disclosure.

FIG. 1 illustrates an example environment 10 including an adaptive search result re-ranking system 100 operatively coupled to one or more merchant systems 101. In one embodiment, the adaptive search result re-ranking system 100 enables a user (herein referred to as a "merchant user") operating a communicatively connected merchant device 102 on behalf of the merchant system 101 to provide inputs to enable the adaptive search result re-ranking system 100 to generate re-ranked search results in view of criteria or constraints identified by the merchant system 101. In an embodiment, the re-ranked search results relate to a merchant and are provided in response to search queries 172 received from end-user systems 170 in accordance with one or more aspects of the disclosure.

According to embodiments, the adaptive search result re-ranking system 100 includes modules configured to perform various functions, operations, actions, and activities, as described in detail herein. In an embodiment, the adaptive search result re-ranking system 100 includes a machine-learning module 110, a ranking data point collector 120, a re-ranking manager 125 and a query manager 130. In an embodiment, the machine-learning module 110 is configured to generate one or more machine-learning models 112 used to generate re-ranked search results in accordance with one or more model parameters maintained by a model parameter database 114.

In an embodiment, the adaptive search result re-ranking system 100 is operatively coupled to one or more merchant systems 101 and one or more end-user systems 170 via a suitable network (not shown). Examples of such a network include the Internet, intranets, extranets, wide area networks (WANs), local area networks (LANs), wired networks, wireless networks, other suitable networks, or any combination of two or more such networks. In one embodiment, the adaptive search result re-ranking system 100 includes the processing device 140 and a memory 150 configured to execute and store instructions associated with the functionality of the various components, services, and modules of the adaptive search result re-ranking system 100, as described in greater detail below in connection with FIGS. 1-5.

According to embodiments, the adaptive search result re-ranking system 100 identifies a metric for processing using one or more machine-learning models. In an embodiment, the one or more machine-learning models are configured to re-rank search results to optimize for a target goal, constraint or criteria (herein referred to as the "re-ranking goal") associated with the metric (e.g., click through rate, quantity of purchases, average product rating, average click rank etc.). For example, the re-ranking goal can include increasing a click through rate, increasing purchases, increasing an average product rating, etc. In an embodiment, the re-ranking goal can include increasing the average rank of a search result that the user "clicks on" or otherwise interacts with, also referred to as an average click rank or "ACR".

In an example, if 200 end users click the first result of a listing of search results and 100 end users click the second result of the listing of search results (i.e., resulting in a total number of clicks of 300), the average clicked result rank can be represented by the following expression:

$$(200/300)*1+(100/300)*2=1.33 \qquad \text{Expression 1}$$

In this example, the listing of search results is re-ranked and the re-ranked listing produces the following click statistics: 250 end users click the first result of the re-ranked listing and 50 end users click the second result of the re-ranked listing. In this example, the average click rank can be represented by the following expression:

$$(250/300)*1+(50/300)*2=1.16 \qquad \text{Expression 2}$$

In an embodiment, a quality of the search result rankings is determined based on a rule (also called the "quality rule") indicating that the closer the value of the ACR is to 1.0, the higher the quality of the search result ranking. In this example, the first listing had an ACR value of 1.33 and the second (re-ranked) listing had an ACR value of 1.16, and, by application of the quality rule, it is determined that the second listing has a higher quality and is preferred as compared to the first listing.

In an embodiment, the metric values (e.g., ACR values) for respective rankings or listings can be compared to one another. For example, a first derivative of the ACR metric with respect to time can be an indicator or measurement of ranking quality. For example, the adaptive search result re-ranking system 100 can determine that over a period of time (e.g., over a month), the ACR metric value changes from 1.33 to 1.16, a delta of −0.17/month is identified as an absolute measure of success or quality. In an embodiment, the adaptive search result re-ranking system 100 can determine an effectiveness of a re-rank based on the aforementioned delta value associated with a re-ranking metric (e.g., ACR before and after for reference).

According to embodiments, the adaptive search result re-ranking system 100 initiates a ranking process using an initial ranking of the search results (also referred to as a "first ranking"). In an embodiment, the initial ranking can be generated using an "offline" ranking process. In an embodiment, during an "online" ranking phase, the adaptive search result re-ranking system 100 can adapt the initial search result ranking in real time based on a set of end-user interactions (e.g., where every end-user interaction can be collected as a data point and used for the "online" re-ranking of search results). In an embodiment, during this phase, the adaptive search result re-ranking system 100 executes a set of one or more experiments or actions (e.g., swapping results 2 and 3, swapping results 4 and 5, etc.) to collect data. In an embodiment, each of the set of one or more experiments or actions includes swapping a single pair of neighboring results. In an embodiment, the adaptive search result re-ranking system 100 analyzes a click distribution corresponding to the experiments and determines whether the results are to be swapped for purposes of presentation to one or more end-user systems (e.g., swapped as part of the "live" ranking of search results provided to an end user in response to a search query).

Advantageously, the adaptive search result re-ranking system 100 performs the offline phase to generate and establish the initial ranking, then executes the online phase to adapt the ranking (e.g., the initial ranking and one or more subsequent re-rankings) over a period of time. Additional details and example processing associated with the offline phase and online phase are described below with reference to FIG. 3.

In an embodiment, the machine-learning module 110 of the adaptive search result re-ranking system 100 is configured to have access to end-user interaction data points associated with one or more events corresponding to search queries and search results (e.g., search events such as clicks, purchases, conversions, interactions, etc.) that are used to update the one or more machine-learning models 112. In an embodiment, the machine-learning model 112 can be periodically stored on a server (e.g., a SQL server) and cached to a software server processing instance (e.g., a Redis instance). In an embodiment, the machine-learning module 110 is communicatively coupled to a ranking data point collector 120.

In an embodiment, the adaptive search result re-ranking system 100 includes the re-ranking manager 125 which is operatively coupled to the machine-learning module 110. The re-ranking manage 125 is a service configured to identify each search query detected by the query manager 130 and request "re-ranking" data from the machine-learning module 110 that is used to re-rank the search results 174 presented to the one or more end-user systems 170.

Figure 2A:
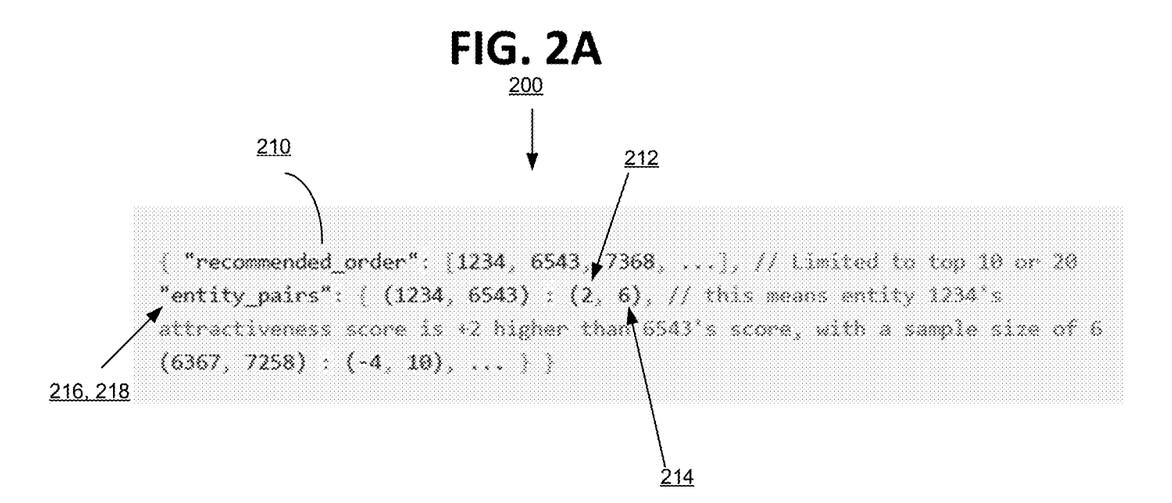
FIGS. 2A and 2B illustrate example sets of model parameters and comparison of multiple search results for generating and adapted re-ranking of search results, according to embodiments of the present disclosure.

In an embodiment, the ranking data point collector 120 is configured to collect the search event-related data points corresponding to search queries 172 received from one or more end-user systems 170 by the query manager 130. In an embodiment, the ranking data point collector 120 is a task (e.g., a daemon task) running on a computing component (e.g., a server) that is configured to execute and connect with the model parameter database 114 to collect one or more model parameters associated with a search query. In an embodiment, the model parameters can be arranged in a data structure (e.g., a hash table such as a Java HashMap) including a collection of key-value pairs which maps to values. In an embodiment, the model parameters include a mapping or association in a data structure (e.g., HashMap) of entity pairs to attractiveness values and an array of entity identifiers including a current recommended search result ranking (e.g., the initial search result ranking identified during the initial offline phase). FIG. 2A illustrates an example model parameter maintained by the model parameter database 114. As shown in FIG. 2A, the example model parameters 200 include the current recommended result ranking 210 associated with the relative attractiveness scores 212 for each entity pair 216, 218. As noted in FIG. 2A, the first entity pair 216 (entity identifier "1234") and the second entity pair (entity identifier "6543") have a relative attractiveness score of "+2", whereby the "1234" entity has a +2 higher attractiveness score as compared to the "6543" entity, based on a particular sample size (e.g., a sample size of "6", as denoted by element 214 of FIG. 2A). In an embodiment, the attractiveness values are established for each entity pair and used for comparison with one another. For example, the attractiveness score can be a measure of a number of clicks, a total revenue associated with the entity pair, a number of appointment bookings associated with the entity pair, etc.

Figure 2B:
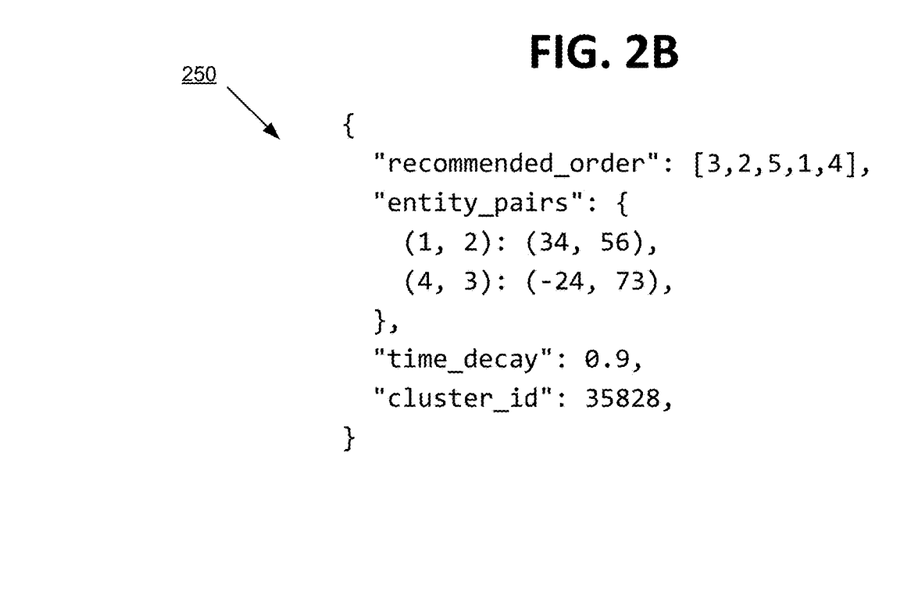

FIG. 2B illustrates an example portion of a file (e.g., a JSON file) 250 including a recommended ranking or order associated with a set of entity pairs. As illustrated, a time decay weighting (e.g., 0.9) can be assigned to the data points for use by the adaptive search result re-ranking system in generating re-ranked search results that account for the time decay associated with the one or more data points.

In an embodiment, the model parameters and associated relative attractiveness scores can be maintained for permutations including entity-pairs that are adjacent to one another in a search result ranking. For example, if entity 1234 and entity 8273 are not arranged adjacent to one another in the search result order (i.e., are not neighboring search results), then those entities (1234 and 8273) are not compared and their attractiveness relative to one another is not stored. In an embodiment, the model parameters include calculated relative attractiveness scores for only the entities that are neighbors in the search result order.

In an embodiment, the attractiveness score can be based on a relative metric associated with the entities. For example, the attractiveness score can be a relative comparison of the number of times each entity was clicked. In another example, the attractiveness score can be based on a comparison of the total revenue generated by each of the entities, the number of bookings associated with the entities (e.g., where the entities represents rental properties, a number of purchases associated with the entities (e.g., where the entities represent products or services), etc.

In an embodiment, each set of model parameters is associated with a specific search query or cluster of semantically equivalent queries. In an embodiment, based on a given search query, the associated model parameters can be retrieved from the model parameter database 114. In an embodiment, since each set of model parameters is associated with a particular search query or cluster of semantically related queries, the specific model parameters can be read from the model parameter database 114 in response to the identification of the corresponding search query or sematic query cluster. In an embodiment, each search query can be assigned a unique identifier (herein the "query identifier" or "cluster identifier") that represents information about the search query. For example, the query identifier can be a concatenation of "query text", "business identifier", and a "vertical identifier" with joining semicolons in between. In this example, the three values are used to uniquely identify a query when it is submitted for purposes of generating re-ranked search results. It is noted that additional or alternative information can be used to identify each search query and can be used to generate the corresponding query identifier.

According to embodiments, the machine-learning module 110 maintains the machine-learning models (e.g., a map of query identifiers to model parameters) in addition to identifying and storing the search events (e.g., clicks, interactions, etc.) collected by the ranking data point collector 120 over a period of time (herein referred to as the "search event period"). For example, the search event period could be N minutes, where all of the search events (e.g., clicks) collected over the past N minutes (e.g., 60 minutes) are identified.

In an embodiment, the machine-learning model 112 is iteratively built and updated based on the data points (e.g., search events) collected by the ranking data point collector 120. In an embodiment, once the machine-learning module 110 has collected the search events for the search event period (e.g., the past N minutes), the machine-learning model 112 uses the collected data points to generate a prediction, estimation or guess associated with the model parameter updates. In an embodiment, the machine-learning module 110 updates the model parameters using the collected data points, encodes the updated model parameters (e.g., in a JSON format) and writes the model parameters to the model parameter database 116. In an embodiment, the machine-learning module 110 can mark all updated portions (e.g., rows of a data structure) as "changed" in the model parameter database 116 (e.g., by setting a changed flag to a "true" value).

In an embodiment, based on the search event period (e.g., every N or fewer minutes), the re-ranking manager 125 executes a read of the model parameters from the model parameter database 116 and identifies the changed rows. In an embodiment, the re-ranking manager 125 writes the changed rows to a software server process (e.g., a Redis instance) with the same format or schema as the model parameter database 116. In an embodiment, the re-ranking manager 125 then resets the "changed" flag on each row to a "false" value.

In an embodiment, the re-ranking manager 125 can receive information associated with a search query 172 from the query manager 130. In an embodiment, the re-ranking manager 125 receives a re-ranking request to generate a re-ranking of search results in response to a search query. In an embodiment, the re-ranking request includes a query identifier from the query manager 130 which identifies information about the search query such as the query text, a business identifier, and a vertical identifier and an original or initial search result order.

In an embodiment, the query manager 130 can employ a query-clustering approach which clusters or groups similar queries together. In this embodiment, by executing a clustering methodology, the query manager 130 can generate clusters of multiple queries that are identified as related and assign each cluster a corresponding cluster identifier. The learned search result ranking and popularity metrics are stored for a specific cluster of related queries and used to re-rank search results for each individual query associated with the cluster. In this regard, the re-ranking information can be associated with a cluster of related queries such that when a query within the cluster is identified, the re-ranking information associated with the cluster can be applied by the re-ranking manager 125. In an embodiment, the query manager 130 can identify a query, determine the query is part of a cluster, and provide the cluster identifier to the re-ranking manager 125 for use in generating re-ranked results for the query.

In an embodiment, the re-ranking manager 125 performs a look-up of the data structure in the model parameter database 116 using the query identifier. In an embodiment, the re-ranking manager 125 reads or identifies the set of model parameters associated with the search query. In an embodiment, if the set of model parameters are encoded (e.g., encoded in JSON), the re-ranking manager 125 decodes the model parameters. In an embodiment, the re-ranking manager 125 uses the model parameters to generate a re-ranked set of search results for the end-user system in response to the search query.

In an embodiment, the re-ranking manager 125 can make changes (e.g., small, random adjustments) to the search result order or ranking as a part of ongoing A/B testing of the machine-learning model 112. In an embodiment, these changes can be detected by a machine-learning module 110 for use in updating the model parameters.

In an embodiment, each entity or candidate search result can have multiple statistical estimates attached to it. For example, one property could be an examination probability "P(X)" that represents the probability of an end-user examining the entity as a search result. In an embodiment, this probability, which can be proportional to the search result's rank (e.g., higher ranked items are more likely to be seen). In an embodiment, the second property can include an attraction probability "P(A)" representing a measurement of how interesting or attractive the search result is to an end user. In an embodiment, the adaptive search result re-ranking system 100 is configured to estimate to determine the attraction probability P(A) so that the set of search results can be sorted or ranked in accordance with a corresponding attraction probability value (e.g., an attractiveness score).

In an embodiment, a search event (e.g., a click) is determined to have occurred when an end user has both examined a search result and found the search result interesting or attractive. In an embodiment, a probability of a search event "P(SE)" (e.g., an end user clicking on the search result) can be represented by the following expression:

$$P(SE)=P(X)*P(A), \quad \text{Expression 3}$$

where "SE" is a search event such as a click and P(SE) is the probability of the search event (e.g., click) occurring.

Figure 3:
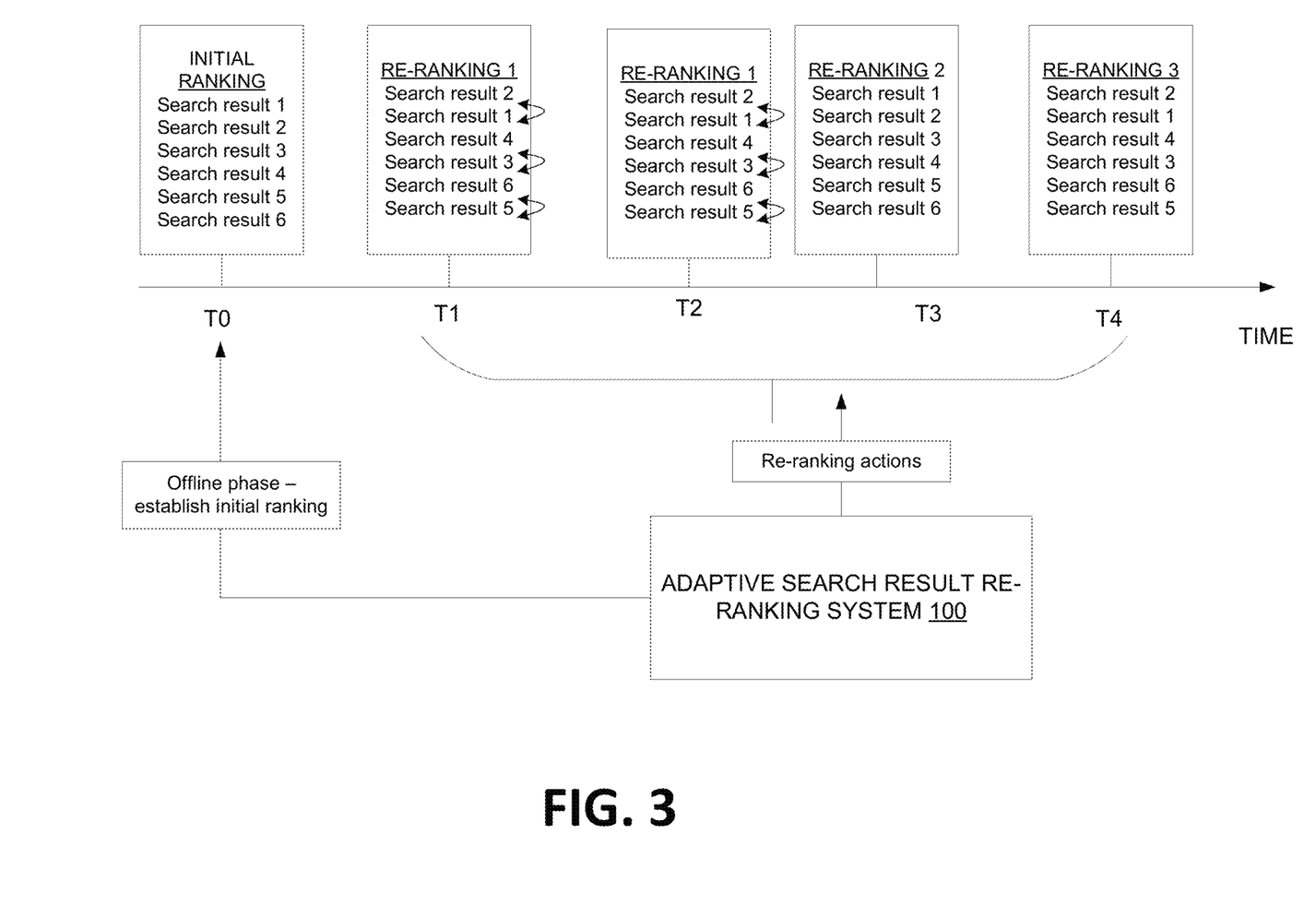
FIG. 3 illustrates an example timeline including multiple re-ranking requests and corresponding re-rankings of search results, according to embodiments of the present disclosure.

In an embodiment, rather than rank the search results based only on the number of clicks since higher-ranked search results with higher P(X) values are disproportionately favored in view of rank bias, the adaptive search result re-ranking system 100 can rank by P(A), correcting for rank bias by isolating the P(A) and P(X) properties from one another. In an embodiment, the adaptive search result re-ranking system 100 can swap neighboring results on every iteration (e.g., every re-ranking request received by the re-ranking manager 125 of FIG. 1). FIG. 3 illustrates an example of the re-ranking process based on a set of multiple re-ranking requests. In the example shown in FIG. 3 and described herein, there are four re-ranking requests corresponding to times T1, T2, T3, and T4. In this example, as shown, the four re-ranking requests relate to re-ranking a set of search results (e.g., search result 1, search result 2, search result 3, search result 4, search result 5 and search result 6). In an embodiment, the re-ranking can be based on an initial ranking or order, as shown at time T0.

In response to each of the re-ranking requests received during the online stage, a respective set of re-ranked responses is generated for an end user system in response to a search query. As shown, at time T1 a first re-ranking action is performed to establish re-ranking 1, at time T2 a second re-ranking action is performed to establish re-ranking 2, at time T3 a third re-ranking action is performed to establish re-ranking 3 and at time T4 a fourth re-ranking action is performed to establish re-ranking 4.

As shown in FIG. 3 neighboring pairs of search results are swapped on every iteration of the re-ranking process. In this example, search result 1 and search result 2 have an average rank of 1.5; search result 3 and search result 4 have an average rank of 3.5; and search result 5 and search result 6 have an average rank of 5.5. In an embodiment, when averaged over time, search result 1 and search result 2 have the same average rank and the same corresponding P(X). Therefore, when comparing search events (e.g., clicks) relating to search result 1 and search result 2, the corresponding P(X) value for each is equivalent, and P(SE) for each can be used as a proxy for P(A) when comparing the two results. Mathematically, this is represented by the following expressions:

$$P(SE \text{ of search result 1})=P(A \text{ of search result 1})*P(X \text{ of 1 and 2}) \quad \text{Expression 4}$$

$$P(SE \text{ of search result 2})=P(A \text{ of search result 2})*P(X \text{ of 1 and 2}) \quad \text{Expression 5}$$

In an embodiment, advantageously, these search results (1 and 2) can be compared and sorted based on P(SE), since the rank bias has been addressed by the neighbor swapping, as shown in FIG. 3. In an embodiment, the search results are sorted in neighboring pairs (e.g., a list having a size of two is sorted), akin to a bubble sort methodology. In an embodiment, while changes may be small, over time, the search results are swapped with their corresponding neighbors and "bubble up" to the correct positions. In an embodiment, once search results 1 and 2 are swapped, these search results may not be swapped in future iterations since their ranking relative to each other has been established based on their relative P(A) values.

In an embodiment, with reference to FIG. 3, search result 2 and search result 3 may be swapped during a second pass where every neighboring pair (i.e., offset 1, such that the first search item on the list is skipped) is swapped. In this example, the re-ranked search result sets can include search results 1 2 3 4 5 6; 1 3 2 5 4 6; 1 2 3 4 5 6, etc.). In an embodiment, the adaptive search result re-ranking system 100 can alternate between offsets of 0 and 1 for pair generation, such that search result items can move or bubble up and down the re-ranked listings.

In an embodiment, the neighbor swapping described above can be performed based on an IP address associated with the end user, so the end user sees the same search results when refreshing the webpage. This prevents a jarring experience where the same end user would see different rankings when refreshing the webpage. In this embodiment, the neighbor swapping can be performed for each iteration involving a new or different end user.

In an embodiment, the adaptive search result re-ranking system 100 can be programmed to perform the neighbor swapping operation at some frequency (e.g., every other re-ranking iteration, every third re-ranking iteration) that is different from every single iteration. In an embodiment, the adaptive search result re-ranking system 100 can include a machine learning model that predicts the P(X) for a given rank. In an embodiment, P(X) is the probability of a result being examined (seen) by a user. A click only occurs when a user both sees a result and finds that result attractive. For example, for a set of 40 user searches, an observation can be made indicating 20 clicks when the entity was in rank 1 and only 5 clicks when it was in rank 2. Since it's the same entity, a reason the entity didn't get more clicks in rank 2 can be because users simply didn't examine it. This means that 15 users didn't click the result (that would have otherwise), simply because they didn't see it when it was in rank 2. As such, the probability of being examined when in rank 2 (i.e. P(X2)) is 5/20 or 25%.

The computed P(SE) can then be divided by the estimated or predicted P(X) to obtain the isolated P(A). In an embodiment, the adaptive search result re-ranking system 100 can be configured to count a specific number of search events (e.g., one click) per IP address In an embodiment, the adaptive search result re-ranking system 100 can identify an end-user fingerprint or identifier to identify each end user system 170 based on one or more end-user data points such as a session identifier, user agent, truncated IP address, etc. In an embodiment, the adaptive search result re-ranking system 100 can perform the A/B testing on different groups of end users. In an embodiment, the adaptive search result re-ranking system 100 can identified a re-rank context based on one or more data points such as the query text business identifier, vertical identifier, search experience key or identifier, etc. In an embodiment, the adaptive search result re-ranking system 100 can determine which entities are to be re-ranked based on one or more data points such as a top N entity identifiers returned for a given re-rank context. In an embodiment, the adaptive search result re-ranking system 100 can determine an order of the top N entities on a search result webpage as shown or displayed to the user. This enables the adaptive search result re-ranking system 100 to determine which entities were next to or neighboring one another, which may differ based on the assigned A/B test group of the end user. In an embodiment, the adaptive search result re-ranking system 100 can determine the entities having an associated search event (e.g., the clicked entities) within a re-rank context, which allows the adaptive search result re-ranking system 100 to update an estimate or prediction as to which entities are most attractive (e.g., have a higher relative attractiveness score or property).

In an embodiment, the adaptive search result re-ranking system 100 can identify an end-user fingerprint or identifier to identify each end user system 170 based on one or more end-user data points such as a session identifier, user agent, truncated IP address, etc.

Figure 4:
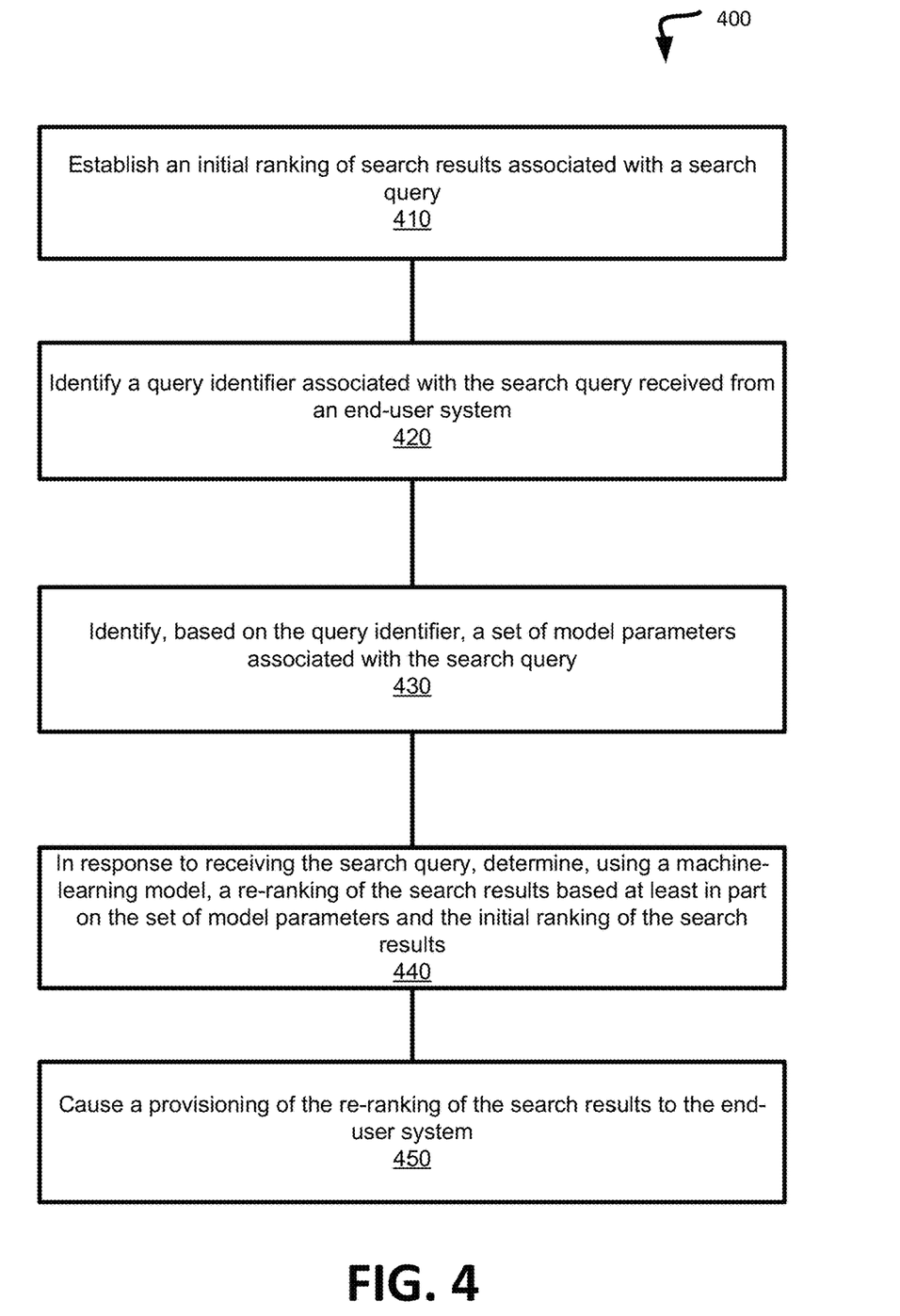
FIG. 4 is an example flow diagram including a search result re-ranking process executed by an adaptive search result re-ranking system, according to embodiments of the present disclosure.

FIG. 4 illustrates a flow diagram illustrating an example process 400 including steps performed by an adaptive search result re-ranking system (e.g., adaptive search result re-ranking system 100 of FIG. 1) to generate re-ranked search results for an end-user system in response to a search query, according to embodiments of the present disclosure. The process 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In operation 410, the processing logic (e.g., processing logic of the adaptive search result re-ranking system 100 of FIG. 1) establishes an initial ranking of search results associated with a search query. In an embodiment, the initial ranking of the set of multiple search results includes an initial order in which the search results are provided to an end-user system. In an embodiment, an initial ranking of the search results is established for each search query.

In an embodiment, the search results corresponding to a search query can be generated, determined or identified using a search engine executing a search algorithm. The search algorithm can include a set of computer-implementable instructions executed to retrieve information stored in a data structure for provisioning search results in response to a search query. In an embodiment, a search algorithm can have many different parts or components that enable the execution of a search as part of a search experience corresponding to an end-user system (e.g., a system associated with an end user submitting a search query) and a merchant (e.g., a company or entity for which the end-user system is seeking information in accordance with the search query). For example, the search algorithm can include components such a spell check component configured to generate an accurate spelling correction associated with a search query, a natural language processing (NLP) filtering component configured to infer or identify a correct NLP filter for search results based on processing of the meaning and context of one or more words or phrases of a search query, and a direct response or "direct answers" component configured to provide a direct response to a search query.

In an embodiment, operation 410 can be performed during an initial "offline" stage where a neural network or machine-learning model is trained using historical data to generate the initial ranking of search results. In an embodiment, the initial ranking can be established based on one or more data points relating to a metric, such as the number of clicks or interactions associated with each respective search result in the set of search results associated with the search query.

In operation 420, the processing logic identifies a query identifier associated with the search query received from an end-user system. In an embodiment, during a second phase (e.g., an online portion of the re-ranking process), the search query is received from an end-user system. In an embodiment, a data store is established which stores information associated with each of the search queries, including a unique identifier or query identifier associated with each search query.

In operation 430, the processing logic identifies, based on the query identifier, a set of model parameters associated with the search query. In an embodiment, the model parameters can include an entity (e.g., a key-value pair) and an associated attractiveness score. In an embodiment, the model parameters can be arranged in a data structure (e.g., a hash table such as a Java HashMap) which includes a collection of key-value pairs. In an embodiment, the model parameters include a mapping or association in a data structure (e.g., HashMap) of each entity pair to a corresponding attractiveness value. In an embodiment, the model parameters can include the "initial" or then "current" search result ranking (e.g., the initial search result ranking identified during the initial offline phase associated with operation 410).

In an embodiment, using a neural network or machine-learning model, one or more model parameters and model parameters updates associated with each search query are identified and stored. In an embodiment, the neural network or machine-learning model includes a mapping of each query identifier to a corresponding set of model parameters along with a set of search events (e.g., clicks, purchases, conversions, interactions, etc.) collected over a set period of time (e.g., a time period of the previous N minutes; where N is 30 minutes, 45 minutes, 60 minutes, etc.).

In operation 440, the processing logic, in response to receiving the search query, determines, using a machine-learning model, a re-ranking of the search results based at least in part on the set of model parameters and the initial ranking of the search results. In an embodiment, the re-ranking of the search results can be performed during an "online" stage in real-time in response to the search query. In an embodiment, the machine-learning model generates the model parameters which are used to re-rank the search results. In an embodiment, the model parameters include an attractiveness score associated with each of the search results corresponding to the search query. In an embodiment, the attractiveness scores of neighboring pairs of search results in the initial ranking are compared to determine a relative attractiveness. For example, the initial ranking of search results can include a first ranked search result with an attractiveness score of 4 and a second ranked search result with an attractiveness score of 6, determined over a period of time based on search events (e.g., clicks, purchases, conversions, etc.). In this example, the attractiveness scores of the neighboring search results can be compared to determine that the second search result has a higher relative attractiveness score. In this example, the re-ranking of the search results can include listing the second search result (of the initial ranking) in a top ranking or higher ranking than the first search result (of the initial ranking).

In operation 450, the processing logic causes a provisioning of the re-ranking of the search results to the end-user system. In an embodiment, the re-ranked listing of search results is provided for display or presentation to the end-user system (e.g., via a graphical user interface associated with the platform or web portal via which the search query was submitted).

In an embodiment, the processing logic can receive a subsequent submission of the search query (e.g., the same query received in operation 440) from an end user. In response to the subsequent submission of the search query, the processing logic can swap a position of neighboring search results in the re-ranking of search results. In an embodiment, advantageously, the swapping of neighbors can be used to address rank bias and provide for the adaptive re-ranking of the search results via updates to the model parameters associated with a respective search query.

Figure 5:
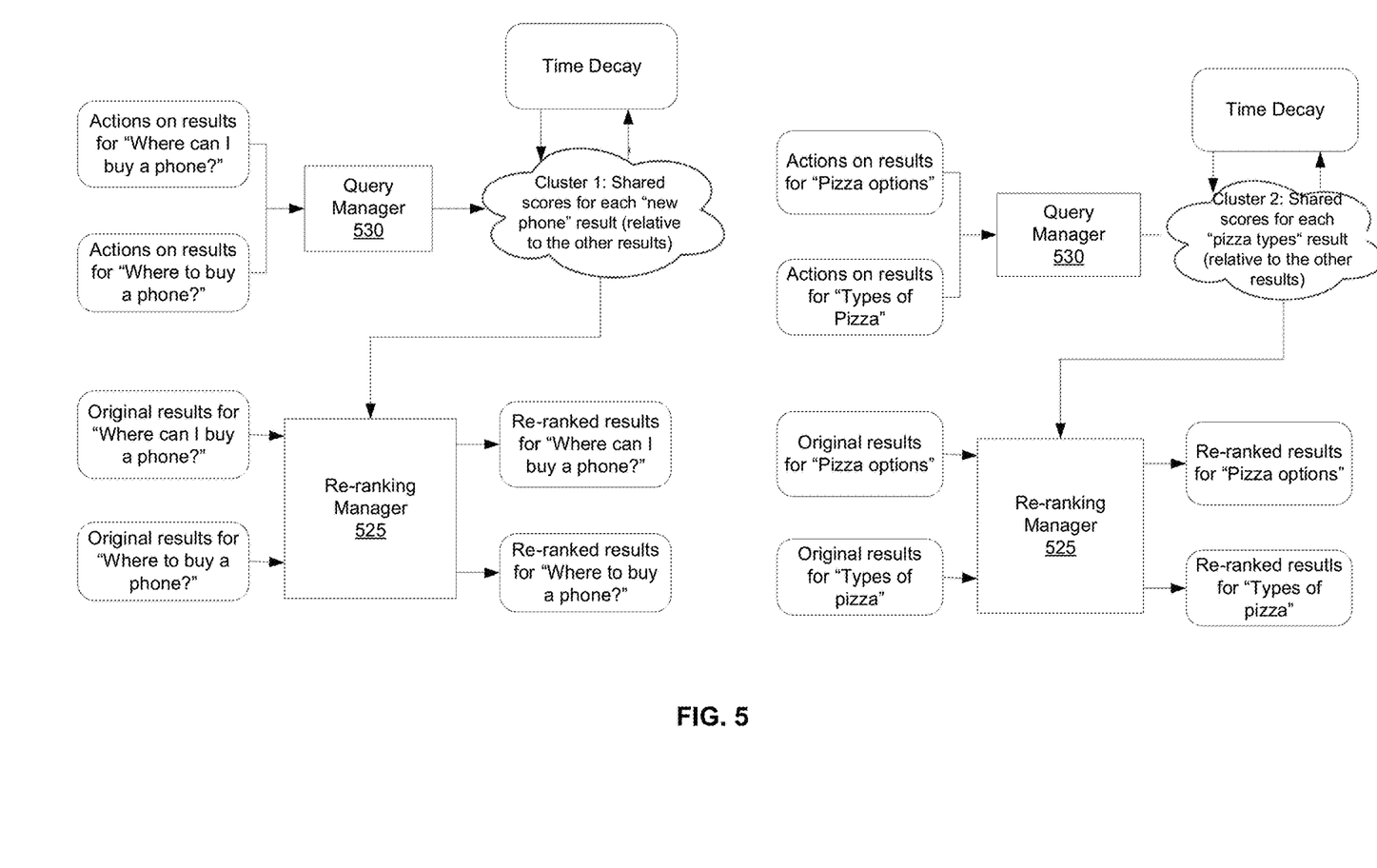
FIG. 5 illustrates examples of processing performed by an adaptive search result re-ranking system to generate re-ranked search results corresponding to a search query cluster, according to embodiments of the present disclosure.

FIG. 5 illustrates examples of processing performed by the adaptive search result re-ranking system of the present disclosure. As illustrated, a query manager 530 of the adaptive search result re-ranking system can identify multiple search query and generate a cluster of related search queries. In the first example shown, a first search query ("Where can I buy a phone?") and a second search query ("Where to buy a phone?") are identified by the query manager 530 as related and a cluster (Cluster 1) is formed including the related search queries. As shown, time decay processing and weighting can be performed relating to the multiple search queries in the cluster. The time decay processing can be used to update the attractiveness scores and the shared scores for each "new phone" result. A re-ranking manager 525 can process the original results (e.g., an original ranking of the search results) for the first query ("Where can I buy a phone?") and the original results for the second query ("Where to buy a phone?") with the information relating to the cluster (Cluster 1) including the time decay weighting to generate first re-ranked results for the first query ("Where can I buy a phone?") and second re-ranked results for the second query ("Where to buy a phone?").

FIG. 5 further illustrates another example of the re-ranking operations performed by the adaptive search result re-ranking system of the present disclosure. As shown, the query manager 530 of the adaptive search result re-ranking system can identify multiple search query and generate a cluster of related search queries. In this example, a first search query ("Pizza Options?") and a second search query ("Types of Pizza") are identified by the query manager 530 as related and a cluster (Cluster 2) is generated including the related search queries. As shown, time decay processing and weighting are performed relating to the multiple search queries in Cluster 2. The time decay processing can be used to update the attractiveness scores and the shared scores for each "pizza types" result relative to the other search results. A re-ranking manager 525 can process the original results (e.g., an original ranking of the search results) for the first query ("Pizza options") and the original results for the second query ("Types of pizza") with the information relating to Cluster 2 including the time decay weighting to generate first re-ranked results for the first query ("Pizza options") and second re-ranked results for the second query ("Types of pizza").

Figure 6:
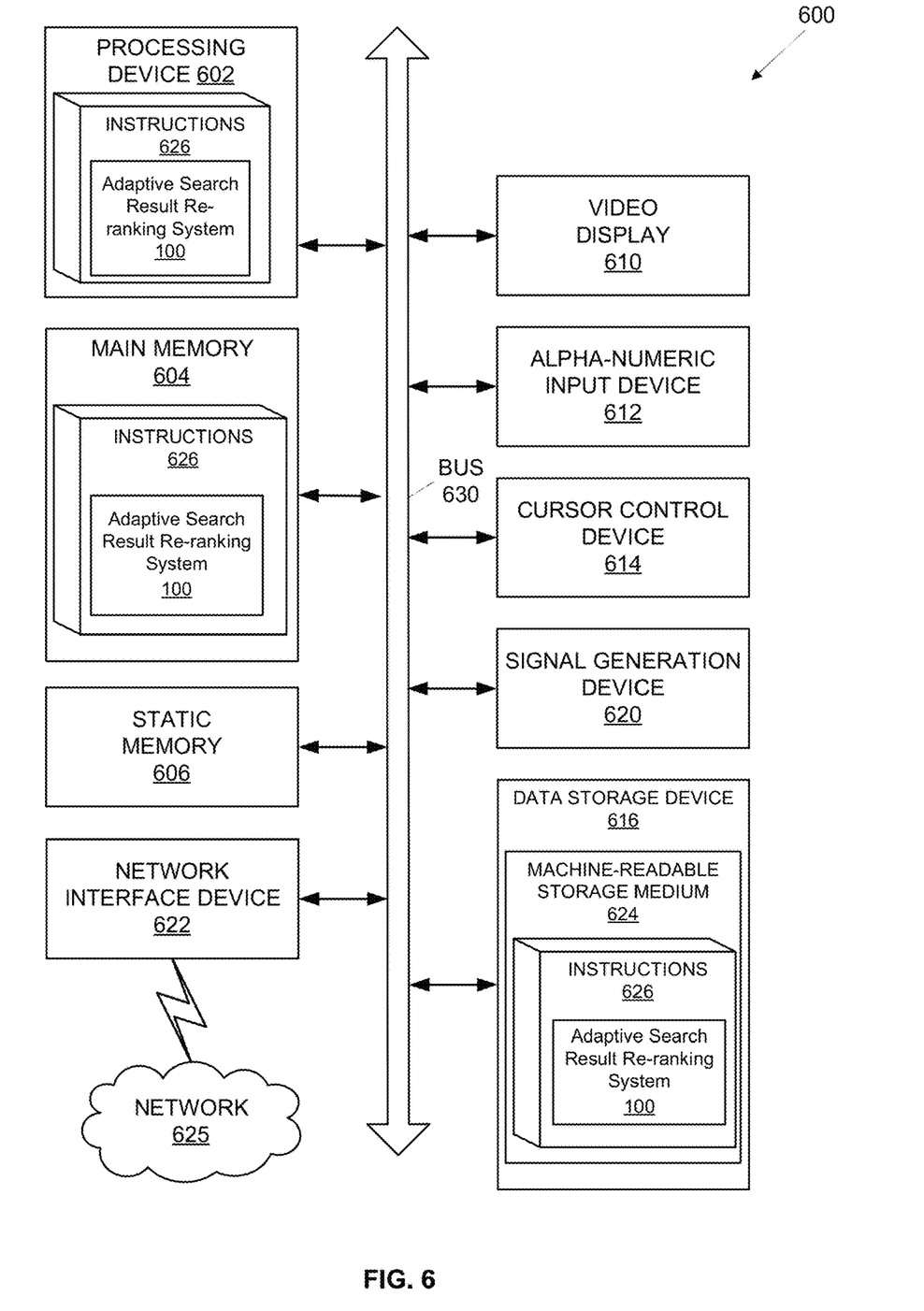
FIG. 6 is a block diagram of an example computer system in which implementations of the present disclosure can operate.

FIG. 6 illustrates an example computer system 600 operating in accordance with some embodiments of the disclosure. In FIG. 6, a diagrammatic representation of a machine is shown in the exemplary form of the computer system 600 within which a set of instructions, for causing the machine to perform any one or more of the methodologies discussed herein, may be executed. In alternative embodiments, the machine 600 may be connected (e.g., networked) to other machines in a local area network (LAN), an intranet, an extranet, or the Internet. The machine 600 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 600. Further, while only a single machine is illustrated, the term "machine" shall also be taken to include any collection of machines that individually or jointly execute a set (or multiple sets) of instructions to perform any one or more of the methodologies discussed herein.

The example computer system 600 may comprise a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 616), which may communicate with each other via a bus 630.

Processing device 602 represents one or more general-purpose processing devices such as a microprocessor, central processing unit, or the like. More particularly, the processing device may be a complex instruction set computer (CISC) processor, reduced instruction set computer (RISC) processor, very long instruction word (VLIW) processor, or processor implementing other instruction sets, or processors implementing a combination of instruction sets. Processing device 602 may also be one or more special-purpose processing devices such as a graphics processing unit (GPU), an application specific integrated circuit (ASIC), a field programmable gate array (FPGA), a digital signal processor (DSP), network processor, or the like. Processing device 602 is configured to execute the adaptive search result re-ranking system 100 performing the operations and steps discussed herein. For example, the processing device 602 may be configured to execute instructions implementing the processes and methods described herein, for supporting an adaptive search result re-ranking system 100, in accordance with one or more aspects of the disclosure.

Example computer system 600 may further comprise a network interface device 622 that may be communicatively coupled to a network 625. Example computer system 600 may further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 620 (e.g., a speaker).

Data storage device 616 may include a computer-readable storage medium (or more specifically a non-transitory computer-readable storage medium) 624 on which is stored one or more sets of executable instructions 626. In accordance with one or more aspects of the disclosure, executable instructions 626 may encode various functions of the adaptive search result re-ranking system 100 in accordance with one or more aspects of the disclosure.

Executable instructions 626 may also reside, completely or at least partially, within main memory 604 and/or within processing device 602 during execution thereof by example computer system 600. Main memory 604 and processing device 602 also constitute computer-readable storage media. Executable instructions 626 may further be transmitted or received over a network via network interface device 622.

While computer-readable storage medium 624 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "analyzing," "using," "receiving," "presenting," "generating," "deriving," "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk (including optical disks, compact disc read-only memory (CD-ROMs), and magnetic-optical disks, read-only memories (ROMs), random access memories (RAMs), EPROMs, EEPROMs, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
    establishing an initial ranking of search results associated with a search query cluster comprising a first search query and a second search query;
    identifying, by a processing device, a first query identifier associated with the first search query received from a first end-user system;
    identifying, based on the first query identifier, a set of model parameters associated with the first search query;
    in response to receiving the first search query, generating, using a machine-learning model, one or more changes to configure a re-ranking of the search results based at least in part on the set of model parameters and the initial ranking of the search results;
    associating the re-ranking of the search results with the search query cluster;
    generating a first graphical user interface to display the re-ranking of the search results to the first end-user system;
    executing, by the machine-learning model, a test using the one or more changes to generate a set of adjusted model parameters associated with the search query cluster;
    identifying a second query identifier associated with the second search query received from a second end-user system; and
    generating a second graphical user interface to display the re-ranking of the search results to the second end-user system.

2. The method of claim 1, wherein the set of model parameters comprises an attractiveness score associated with each of the set of search results corresponding to the search query cluster.

3. The method of claim 1, further comprising swapping a position of a first search result and a second search result of the re-ranking of the search results to generate a further re-ranking of the search results.

4. The method of claim 3, further comprising in response to receiving a subsequent submission of the first search query, causing the further re-ranking of the search results to be provided.

5. The method of claim 1, wherein the set of adjusted model parameters is generated based at least in part on data points associated with search events collected over a period of time.

6. The method of claim 1, further comprising generating subsequent re-rankings of the search results based on the set of adjusted model parameters.

7. A system comprising:
a memory to store instructions; and
a processing device operatively coupled to the memory, the processing device to execute the instructions to perform operations comprising:
establishing an initial ranking of search results associated with a search query cluster comprising a first search query and a second search query;
identifying a first query identifier associated with the first search query received from a first end-user system;
identifying, based on the first query identifier, a set of model parameters associated with the first search query;
in response to receiving the first search query, generating, using a machine-learning model, one or more changes to configure a re-ranking of the search results based at least in part on the set of model parameters and the initial ranking of the search results;
associating the re-ranking of the search results with the search query cluster,
generating a first graphical user interface to display the re-ranking of the search results to the first end-user system;
executing, by the machine-learning model, a test using the one or more changes to generate a set of adjusted model parameters associated with the search query cluster;
identifying a second query identifier associated with the second search query received from a second end-user system; and
generating a second graphical user interface to display the re-ranking of the search results to the second end-user system.

8. The system of claim 7, wherein the set of model parameters comprises an attractiveness score associated with each of the set of search results corresponding to the search query cluster.

9. The system of claim 8, the operations further comprising swapping a position of a first search result and a second search result of the re-ranking of the search results to generate a further re-ranking of the search results.

10. The system of claim 9, the operations further comprising, in response to receiving a subsequent submission of the first search query, causing the further re-ranking of the search results to be provided.

11. The system of claim 7, wherein the set of adjusted model parameters is generated based at least in part on data points associated with search events collected over a period of time.

12. The system of claim 7, the operations further comprising generating subsequent re-rankings of the search results based on the set of adjusted model parameters.

13. A non-transitory computer readable storage medium having instructions that, if executed by a processing device, cause the processing device to perform operations comprising:
establishing an initial ranking of search results associated with a search query cluster comprising a first search query and a second search query;
identifying a first query identifier associated with the first search query received from a first end-user system;
identifying, based on the first query identifier, a set of model parameters associated with the first search query;
in response to receiving the first search query, generating, using a machine-learning model, one or more changes to configure a re-ranking of the search results based at least in part on the set of model parameters and the initial ranking of the search results;
associating the re-ranking of the search results with the search query cluster;
generating a first graphical user interface to display the re-ranking of the search results to the first end-user system;
executing, by the machine-learning model, a test using the one or more changes to generate a set of adjusted model parameters associated with the search query cluster;
identifying a second query identifier associated with the second search query received from a second end-user system; and
generating a second graphical user interface to display the re-ranking of the search results to the second end-user system.

14. The non-transitory computer readable storage medium of claim 13, wherein the set of model parameters comprises an attractiveness score associated with each of the set of search results corresponding to the search query cluster.

15. The non-transitory computer readable storage medium of claim 14, the operations further comprising swapping a position of a first search result and a second search result of the re-ranking of the search results to generate a further re-ranking of the search results.

16. The non-transitory computer readable storage medium of claim 13, the operations further comprising, in response to receiving a subsequent submission of the first search query, causing a further re-ranking of the search results to be provided.

17. The non-transitory computer readable storage medium of claim 13, wherein the set of adjusted model parameters is generated based at least in part on data points associated with search events collected over a period of time.

18. The non-transitory computer readable storage medium of claim 13, the operations further comprising generating subsequent re-rankings of the search results based on the set of adjusted model parameters.

* * * * *